May 17, 1932.　　　　C. H. SMOOT　　　1,858,689
MECHANISM FOR CONTROLLING A PLURALITY OF FLUID FLOWS
Filed Feb. 1, 1930　　2 Sheets-Sheet 2

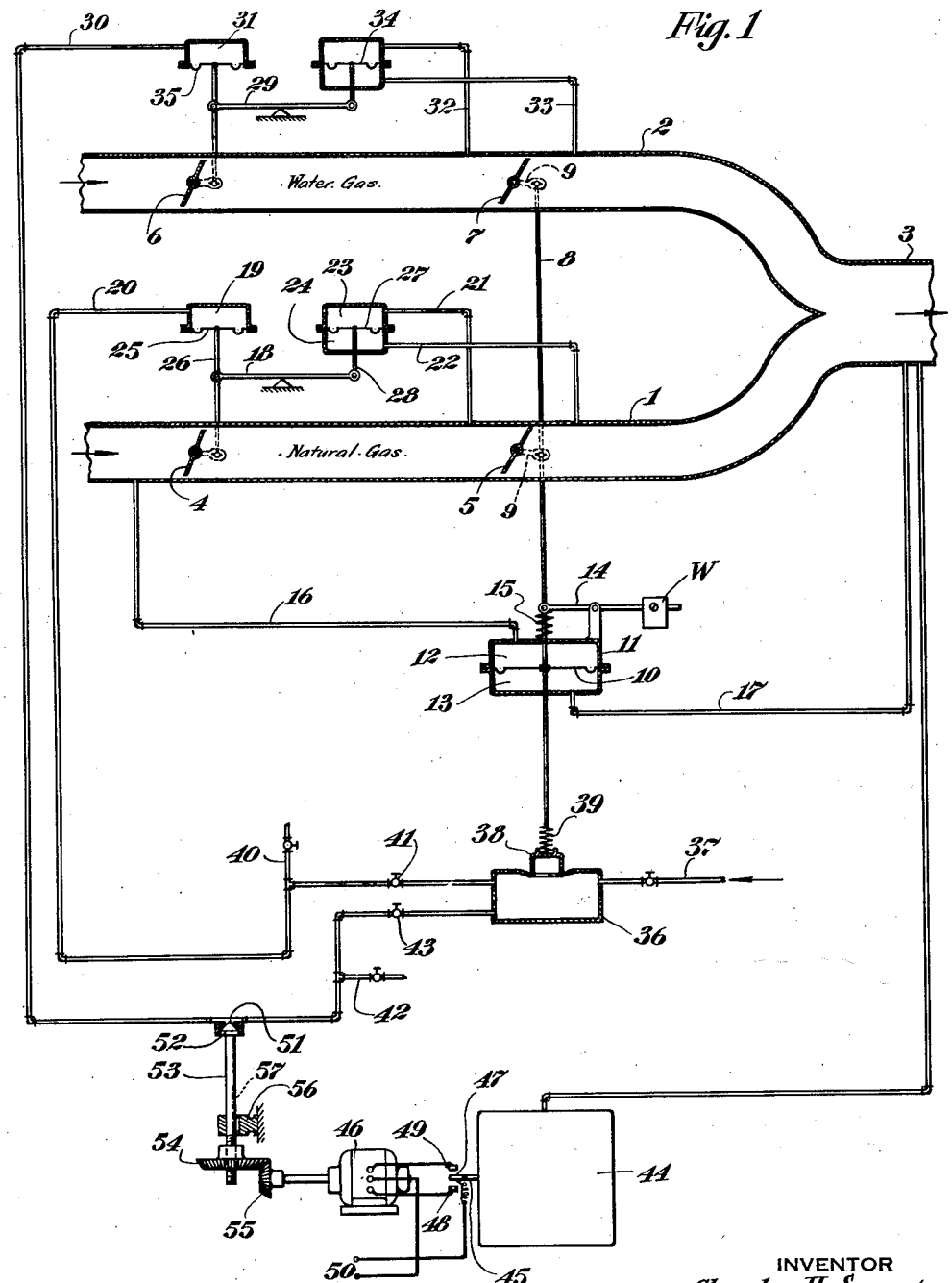

INVENTOR
Charles H. Smoot,
BY
ATTORNEYS

Patented May 17, 1932

1,858,689

UNITED STATES PATENT OFFICE

CHARLES H. SMOOT, OF MAPLEWOOD, NEW JERSEY

MECHANISM FOR CONTROLLING A PLURALITY OF FLUID FLOWS

Application filed February 1, 1930. Serial No. 425,124.

My invention relates to fluid regulation, and more particularly to the regulation of the flows of two or more fluids delivered through separate pipes into a common conduit. Although my invention is of particular value where the supply of one of the fluids is a variable or uncontrollable quantity and where the mixture is used for heating purposes, it may be advantageously employed whenever it is desired to maintain a predetermined ratio between two or more fluid flows. In some respects, the present invention is an improvement over that disclosed and claimed in my Patent No. 1,772,920, issued August 12, 1930.

For a better understanding of the invention reference should be had to the accompanying drawings of which:

Fig. 1 illustrates one embodiment of the invention as applied to the control of the flows of natural gas and water gas in response to the supply pressure of one of the gases and to the pressure of the mixture.

Figure 3:
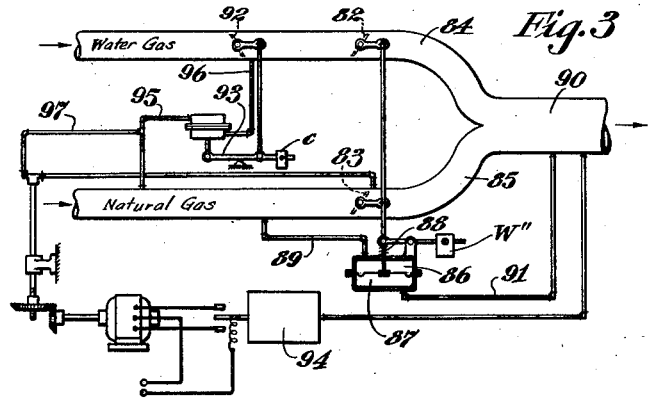
Fig. 3 illustrates another modification combining certain features of the modifications illustrated in Figs. 1 and 2.

Referring to Fig. 1, natural gas, the supply of which cannot readily be controlled, flows through conduit 1 and water gas, the supply of which may be arranged to be greater than any demand therefor, flows through conduit 2; the gases passing together through the mixing conduit 3. Valves or dampers 4 and 5 control the flow of natural gas through conduit 1 and valves or dampers 6 and 7 control the flow of water gas through conduit 2. Valves 5 and 7 are connected for combined movement by means of a rod 8 and links 9. Rod 8 is connected to a diaphragm 10 mounted within a casing 11 and dividing the space therein into two chambers 12 and 13. Linked to rod 8 is one end of a lever 14 pivoted upon an upwardly extending portion of casing 11 and carrying an adjustable weight W on its other end. Weight W thus tends to raise rod 8 to close dampers 5 and 7. Also tending to lift rod 8 is a helical compression spring 15 mounted between casing 11 and a fixed stop on rod 8; the rod passing axially through the spring. Chamber 12 is connected to conduit 1 in advance of damper 4 by means of a pipe 16. The pressure in chamber 12 thus exerts a downward force upon diaphragm 11 varying with the supply pressure of the natural gas and tending to open dampers 5 and 7 upon an increase in supply pressure. Chamber 13 is connected to a suitable point in conduit 3 by means of a pipe 17. The pressure in chamber 13 thus exerts an upward force on diaphragm 11 varying with the pressure of the mixed gases. The function of spring 15 in the above described control of dampers 5 and 7 is one of stability. It insures a pressure differential between chambers 12 and 13 increasing with the damper opening, thus giving a stabilizing loading force to the regulation tending to insure a definite position of dampers 5 and 7 for each pressure differential acting upon diaphragm 10.

Damper 4 is controlled by the position of a balancing device indicated diagrammatically as a pivoted lever 18 acted upon by a controlling pressure transmitted to a chamber 19 through a pipe 20 and by the differential of pressures across damper 5 as transmitted through pipes 21 and 22 to chambers 23 and 24 respectively. Pressure in chamber 19 acts upon a diaphragm 25 connected to one end of lever 18 by means of a rod 26 and the differential of pressures in chambers 23 and 24 acts upon diaphragm 27 connected to the other end of lever 18 by means of a rod 28. Damper 4 and lever 18 are connected together by suitable linkage in such a manner that a clockwise rotation of lever 18 tends to close the damper.

Damper 6 is controlled similarly to damper 4 by a balancing device, indicated diagrammatically as a pivoted lever 29 moved in response to a controlling pressure transmitted through a pipe 30 to a diaphragm closed chamber 31 and in response to the pressure differential across damper 7 as measured by pipes 32 and 33 and transmitted thereby to either side of a diaphragm 34, diaphragm 35 closing chamber 31, diaphragm 34 and damper 6 all being operatively connected to lever 29.

Means are provided for varying the controlling pressures in pipes 20 and 30 responsively with the position of dampers 5 and 7. These means comprise a casing 36 to which air or other fluid under pressure is admitted through a pipe 37 from any suitable source (not shown) and to which pipes 20 and 30 are connected. The air under pressure within casing 36 may exhaust to atmosphere through a leakage port under control of a cup valve 38. Cup valve 38 is held against the pressure within casing 36 by a compression spring 39 connected at one end to the valve 38 and at the other end to rod 8. The pressure within casing 36 will vary, therefore, with the compression of spring 39 which in turn varies as a function of the setting of dampers 5 and 7, increasing as the dampers are opened. Pipe 20 is provided with a valve controlled branch exhaust pipe 40 and with an adjustable valve 41 between the exhaust pipe 40 and casing 36. Similarly pipe 30 is provided with a valve controlled branch exhaust pipe 42 and with an adjustable valve 43 between the exhaust pipe 42 and casing 36. The controlling pressures in pipes 20 and 30 are thus adjustable by means of valves 41 and 43 and by the valves in the exhaust pipes 40 and 42 with respect to the pressure in casing 36 and with respect to each other.

Where the gaseous mixture in conduit 3 is utilized for heating purposes, means may be provided to insure the proper consistency of the mixture. Such means may take the form of a B. t. u. meter arranged to sample the mixed gas in conduit 3 and to adjust the ratio between the gas flows upon a departure in the B. t. u. content of the mixture from the desired value. Box 44 indicates diagrammatically any suitable B. t. u. meter of the type having a member 45 movable in one direction or the other upon a change in the thermal constituency of the gas being metered. I utilize the departure of member 45 from neutral position to close electric circuits to energize a reversible electric motor 46 in one direction or the other by means of a contact 47 carried by member 45 and adapted upon displacement to engage either of fixed contacts 48 and 49, two of the terminals of motor 46 being connected to contacts 48 and 49 and the other terminal of the motor and contact 47 being connected to opposite sides of power lines 50. To vary the ratio of the fluid flows in response to the B. t. u. content of the gaseous mixture in conduit 3, a leakage port 51 in either pipe 20 or 30 is provided with an adjustable valve 52. A rod 53 has mounted at one end thereof the valve 52 and is threaded at its other end. A gear 54, meshing with a gear 55 on the shaft of motor 46 is screw threadedly mounted on the threaded portion of rod 53 and serves to move rod 53 longitudinally upon rotation of the motor, rod 53 being prevented from rotation by means of a keyed bearing 56 cooperating with a longitudinal slot 57 in the rod.

In operation of the regulating device of Fig. 1 if the supply of natural gas falls for any reason, the pressure differential across diaphragm 10 will decrease with the result that weight W will cause lever 14 to rock in a clockwise direction and rod 8 to be lifted to move dampers 5 and 7 to a position corresponding to the decreased pressure differential across diaphragm 10 and the decreased tension in spring 15 occasioned by the movement of the rod. This partial closure of dampers 5 and 7 increases the pressure differences across these dampers and, therefore, upsets the balance of forces on levers 18 and 29. The balance of forces on levers 18 and 29 are also upset by the decrease in pressure in casing 36, and consequently in chambers 19 and 31 as well, due to the upward movement of rod 8 and the consequent decrease in tension of spring 39. Levers 18 and 29 will tip therefore to close dampers 4 and 6 to reduce the flows through conduits 1 and 2 until the balance of forces is restored. Inasmuch as the above operation was initiated by a decrease in supply pressure of the natural gas, the flow through conduit 1 must have decreased with respect to that through conduit 2 and the pressure differential across damper 5 must, therefore, have been correspondingly less than that across damper 7. This being the case damper 4 will not need to close to as great an extent as damper 6 in order to restore balance upon the levers and to thereby insure a return of the fluid flows to the desired ratio.

Conversely an increase in the supply pressure of the natural gas causes a downward movement of rod 8 to move dampers 5 and 7 to a position determined by the changed pressure differential across diaphragm 10 and by the increased tension in spring 15 occasioned by the movement of the rod. This partial opening of dampers 5 and 7 reacts upon the control of dampers 4 and 6, as does the increased pressure in chambers 19 and 31 occasioned by the downward movement of rod 8 to partially open these dampers and to thus assist dampers 5 and 7 in increasing the flows through conduits 1 and 2 while insuring the maintenance of the desired ratio therebetween.

As in my prior application, above referred to, dampers 4 and 6 thus serve not only to insure the proper proportionality between the flows of the two gases, but also to increase the range of operation of dampers 5 and 7. It will be noted that a change in supply pressure of the natural gas or in the pressure in conduit 3 normally causes operation of all of the dampers, each assuming its own share of the regulation, whereas a change in the flow of either gas causes operation of one or the other of dampers 4 or 6 only. When a B. t. u. meter is employed as heretofore described, a decrease in the thermal properties of the mixture will cause member 45 to move to cause energization of motor 46 in such direction as to lower rod 53 and to thereby increase the leakage past valve 52. The pressure in chamber 31 will thus be decreased and lever 29 will tip to close damper 6 until the pressure differential across damper 7 has been reduced proportionately to the reduction in controlling pressure. Conversely, an increase in the thermal properties of the mixture will operate to cause a decrease in the ratio between the flow of natural gas and that of the water gas.

Obviously the apparatus illustrated in Fig. 1 may be extended to the control of any number of fluid flows by linking one damper in each flow to an extension of rod 8 and by providing additional pipe lines for the transmission of controlling pressures from chamber 36, one for each regulating device for the second damper in each flow.

Figure 2:
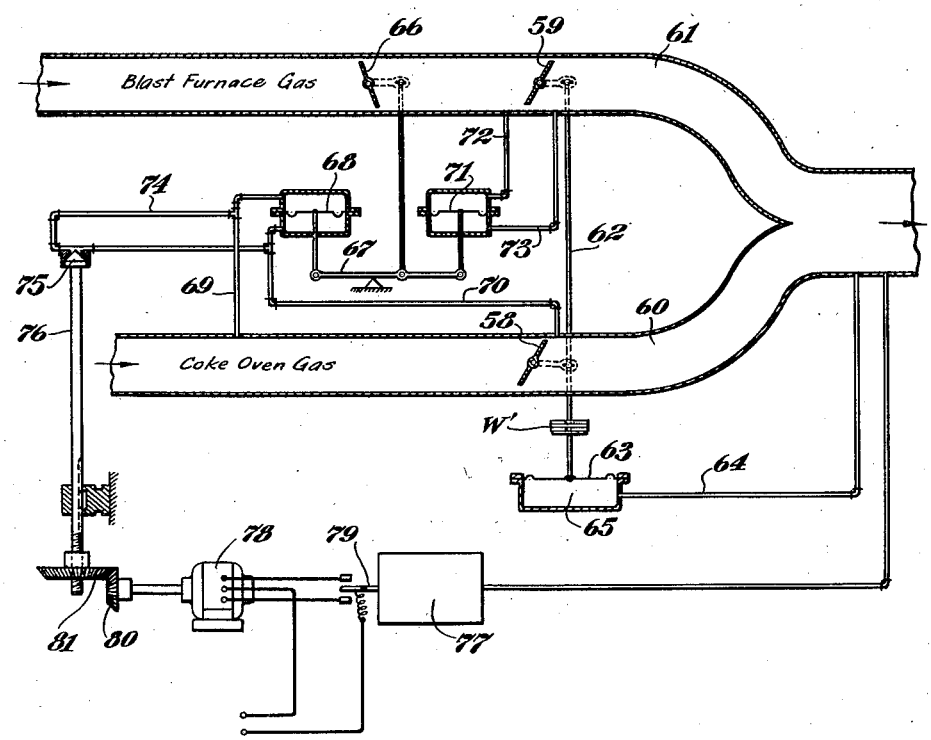
Fig. 2 illustrates a modification as applied to the control of blast furnace gas and coke oven gas arranged for the maintenance of a constant pressure of the gaseous mixture.

In Fig. 2 I have illustrated a slightly different arrangement for accomplishing the same type of secondary regulation as that obtained by the apparatus of Fig. 1 utilizing but three instead of four dampers. The arrangement of Fig. 2 is not as suitable as that of Fig. 1 when regulation is desired throughout a wide range of fluid flows. The elimination of one damper makes the modification of Fig. 2 preferable in some instances, however, to that of Fig. 1. In the particular modification illustrated in Fig. 2 I have shown the primary control as being responsive to the pressure of the gaseous mixture rather than to the differential between the supply pressure of one of the fluids and the pressure of the mixture. Such arrangement is suitable when the supply pressures of both gases are greater than any demand therefor, as in the case, for example of coke oven and blast furnace gases.

Referring to Fig. 2, dampers 58 and 59 in conduits 60 and 61 respectively are connected together for combined movement by rod 62, the lower end of which is connected to a diaphragm 63 subjected on its lower side to the pressure of the gaseous mixture as transmitted through pipe 64 to a chamber 65. A weight W' on rod 62 opposes the upward force of the pressure in chamber 65 and serves to open the dampers upon decrease in pressure of the mixed gases. A third damper 66, located in this instance in conduit 61 through which blast furnace gas is flowing is connected by suitable linkage to a balancing device 67. Device 67 is acted upon in one direction by the differential of forces across damper 58 as transmitted to either side of a diaphragm 68 by pipes 69 and 70 and in the other direction by the differential of pressures across damper 59 as transmitted to either side of a diaphragm 71 by pipes 72 and 73, diaphragms 68 and 71 being connected to opposite ends of the balance. Balance 67 maintains a definite ratio between the pressure differentials across dampers 58 and 59 and thus by adjustment of damper 66 maintains the flow of blast furnace gas through conduit 61 in proportion to the flow of coke oven gas in conduit 60. When adjustment of the flow ratio is desired to maintain constant the B. t. u. content of the mixture, a by-pass 74 is provided between pipes 69 and 70 in which is a valve 75 normally permitting a slight leakage therethrough from pipe 69 to pipe 70 and adjustable by means of vertical movement of a rod 76 to increase or decrease the leakage. Rod 76 may be operated in any suitable manner in response to the B. t. u. content of the mixed gases as measured by a B. t. u. meter 77. As shown, the means for operating rod 76 are similar to those shown in Fig. 1 for operating rod 53, and comprise a reversible electric motor 78 operable in one direction or the other in response to movement of the meter needle 79 to raise or lower the rod by means of gear 80, on the shaft of the motor, and gear 81 screw-threadedly mounted on rod 76, rod 76 being keyed to prevent rotation thereof.

The device of Fig. 2 operates to maintain constant pressure of the mixed gases and to maintain a definite ratio between the gaseous flows for each value of the B. t. u. content of the mixture. Obviously a spring loading could be applied to rod 62 if desired to increase the stability of the operation in the same manner as does spring 15 in Fig. 1.

In Fig. 3, I have illustrated the primary control of Fig. 1 applied to a secondary control equivalent to that of Fig. 2 to control the flow of two gases where the supply pressure of one is uncontrollable. Valves 82 and 83 in conduits 84 and 85 respectively are connected together for combined movement in response to the differential in pressure between chambers 86 and 87, and in response to the forces introduced by the tension of spring 88 and by the weight W''; chamber 86 being connected by pipe 89 with conduit 85 in advance of damper 83 and chamber 87 being connected with the mixing conduit 90 by means of pipe 91. Damper 92 in conduit 84 maintains the fluid flows in proportion under control of balancing device 93 in response to the ratio of the pressure differentials across dampers 82 and 83 and adjusts the ratio between the fluid flows in response to the B. t. u. content of the mixture as measured by the meter 94.

In Fig. 3, although the pressure differentials across dampers 82 and 83 are not actually measured, the secondary regulation directed to the control of damper 92 is the equivalent of that of damper 66 in Fig. 2 where the pressure differentials across dampers 58 and 59 are indicated as being measured. Reference to Fig. 2 will make clear that these controls are in fact equivalent. The pressures measured by pipes 70 and 73 in Fig. 2 act oppositely upon the balance device 67, and are always equal or in proportion as there is no variable resistance beyond the jointly operated dampers 58 and 59. Consequently these pipes and the chambers associated therewith could be eliminated and a weight substituted therefor, without effecting the operation. Referring now to Fig. 3 it will be noted that a pressure transmitted through a pipe 95, corresponding to that transmitted through pipe 69 in Fig. 2, opposes that transmitted through a pipe 96 corresponding to that transmitted through pipe 72 of Fig. 2 and that a weight C acting upon the balance 93 is provided instead of the corresponding pipes 70 and 73 and associated chambers of Fig. 2. In Fig. 3, the adjustment of the ratio in response to the B. t. u. content of the mixture is effected in substantially the same way as in Fig. 2, being by control of the leakage through a pipe 97 connecting pipe 95 with a suitable point beyond the joint dampers where the pressure is always less than in pipe 95.

Various modifications of the invention have now been described. In each modification means are provided for maintaining a predetermined ratio between two fluid flows and for adjusting the ratio in response to the B. t. u. content of the mixture. In each modification the primary regulation is effected by a combined movement of one regulator in each flow in response to controlling forces one of which varies as a function of the mixture and the secondary regulation is effected by movement of at least one other regulator in response to the effects produced by the primary regulation. In each modification the adjustment of the ratio in response to the B. t. u. content is effected by the secondary regulation.

I claim:

1. In a mechanism for controlling a plurality of fluid flows, a regulator for each flow, primary means responsive to a varying function of all of the flows for controlling said regulators in unison, secondary means varying with the pressure differentials across said regulators for maintaining a predetermined ratio between the fluid flows, and a device responsive to the thermal content of all of said flows for automatically adjusting said secondary means to vary said ratio.

2. A mechanism for controlling the flows of constituent fluids to a mixture thereof comprising in combination a regulator for the flow of each constituent fluid, primary means responsive to the supply pressure of one of said fluids and to the pressure of the mixture for adjusting all of said regulators in unison, and means varying with the pressure differentials across said regulators for maintaining a predetermined relation between the flows of said constituent fluids.

3. A mechanism according to claim 2 including a device responsive to the thermal content of the mixture for adjusting said predetermined relation.

4. A mechanism according to claim 2 including a stabilizing loading force for said primary means arranged to increase and decrease upon increase and decrease respectively in the difference between the supply pressure of one of the fluids and the pressure of the mixture.

5. In a mechanism for maintaining a predetermined ratio between the flow of two fluid constituents to a mixture thereof, a regulator for each flow, a device responsive to a function of both fluid flows adapted to adjust both of said regulators in unison, a second regulator for one of said flows, and a device responsive to the ratio of the pressure differentials across said first mentioned regulators and adapted to position said last mentioned regulator.

6. A mechanism according to claim 5 including a device responsive to the heat content of the mixture and adapted to modify the operation of the device responsive to the ratio of the pressure differentials across the first mentioned regulators.

7. A mechanism for controlling the flows of constituent fluids to a mixture thereof comprising in combination a regulator for each flow, primary means responsive to a varying function of all of the flows and to a stabilizing force for controlling said regulators in unison and for varying said stabilizing force in a direction to increase when said regulators are moved in a direction to decrease said flows, and means varying with the pressure differentials across said regulators for maintaining a predetermined ratio between the fluid flows.

8. In a mechanism for controlling a plurality of fluid flows, a regulator for each flow, a device responsive to a varying function of all of the flows for controlling said regulators in unison, additional means including a second regulator for at least one of said flows for maintaining a predetermined ratio between the flows in response to the pressure differentials across said first mentioned regulators, and a remote control device for automatically adjusting said additional means to vary the ratio maintained thereby.

In testimony whereof I have signed my name to this specification.

CHARLES H. SMOOT.